April 21, 1936.   P. C. TEMPLE   2,038,013
REGULATING VALVE
Filed July 7, 1932
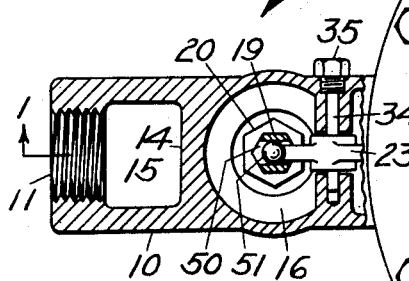
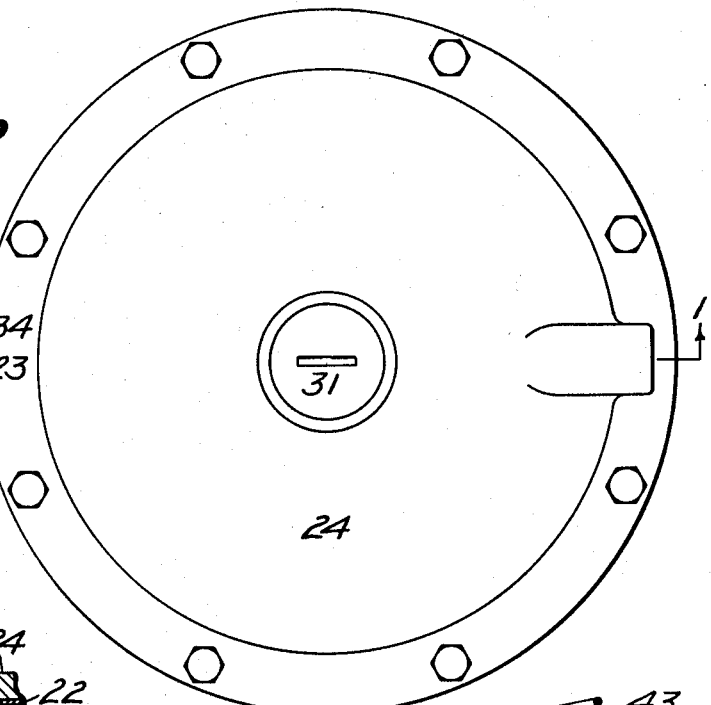
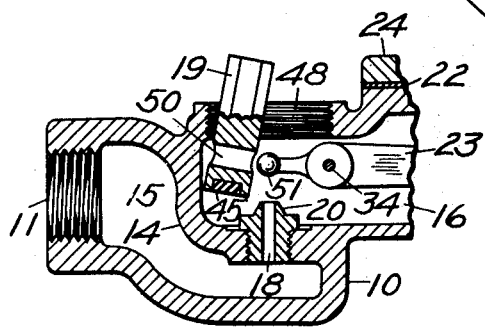
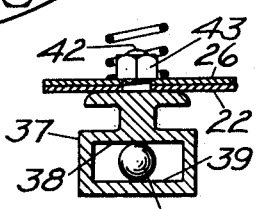
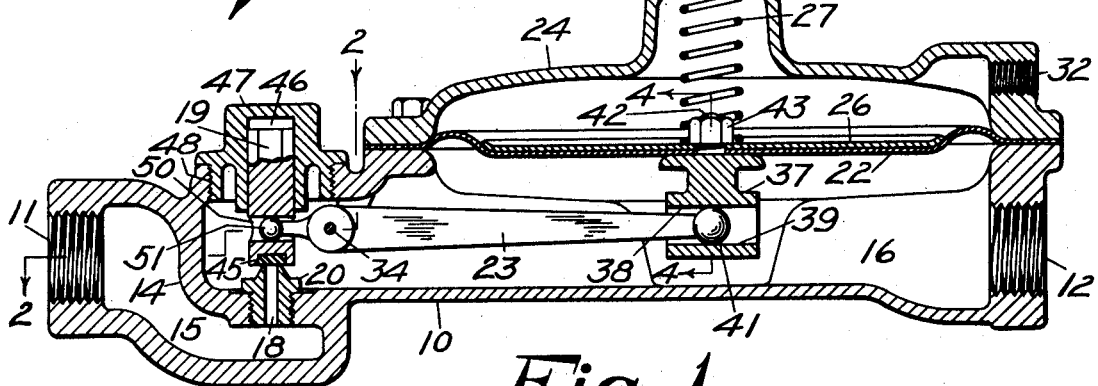
INVENTOR
PAUL C. TEMPLE
BY
Albert G. Blodgett
ATTORNEY Patented Apr. 21, 1936

2,038,013

UNITED STATES PATENT OFFICE 2,038,013

REGULATING VALVE

Paul C. Temple, Decatur, Ill., assignor to A. W. Cash Company, Decatur, Ill., a corporation of Delaware Application July 7, 1932, Serial No. 621,131

7 Claims. (Cl. 50—26)

This invention relates to regulating valves, and more particularly to a mechanism of this type which comprises a pressure responsive device, such as a flexible diaphragm, connected to a flow controlling valve member by means of a pivotally mounted lever.

Valves of this general construction are frequently installed in residences for regulating the pressure of gas, and the installations are often scattered over wide areas and in rural districts. Consequently, the workmen available for replacing parts subject to wear usually have slight mechanical ability, and it is of the utmost importance that these parts be readily accessible, so that replacement may be accomplished in the simplest possible manner. This is particularly true with respect to the valve member itself, which ordinarily wears more rapidly than the other parts of the mechanism.

It is accordingly one object of the invention to provide a regulating valve, including a pressure responsive device connected to a valve member by means of a pivoted lever, which is so arranged that the various parts subject to wear may be easily replaced by unskilled workmen.

It is a further object of the invention to provide a construction of this general type which is so arranged that the valve member will be positively actuated in both directions by the lever, and yet the valve member may be readily removed for replacement without disturbing the lever.

In the actual operation of pressure regulating valves there is a tendency for the various movable parts to stick and cause erratic operation, resulting in undesirable variations in the fluid pressure at the discharge side of the valve. This is frequently the result of lateral forces imparted to the lever by the diaphragm, which cause the lever to bind on its pivotal support.

It is accordingly one object of the invention to provide a regulating valve which is so arranged that the various movable parts will function freely at all times, and particularly to provide a construction which will overcome all tendency of the lever to bind as a result of lateral forces imparted thereto by the diaphragm.

With these and other objects in view, as will be apparent to those skilled in the art, the invention resides in the combination of parts set forth in the specification and covered by the claims appended hereto.

In accordance with my invention I provide a flow controlling valve member which is moved by means of a lever, the lever being actuated by a fluid pressure responsive device, such as a flexible diaphragm. A suitable removable closure, such as a screw plug, is associated with an opening in the valve casing, and the parts are so arranged that after this plug is removed the valve member may be readily disconnected from the lever and removed through the opening. The closure is preferably shaped to provide a guideway which slidably supports the valve member. The diaphragm carries a member arranged to actuate the lever, and the member and lever are so shaped that lateral forces cannot be transmitted to the lever and cause it to bind. In the preferred construction one of these parts is shaped to provide two spaced opposed parallel plane surfaces, and the other part is provided with spherical surfaces which contact with these plane surfaces.

Referring to the drawing illustrating one embodiment of the invention, and in which like reference numerals indicate like parts, Fig. 1 is a longitudinal section through a regulating valve, the section being taken on the line 1—1 of Fig. 2;

Fig. 2 is a top plan view of the regulating valve, a portion being shown in section on the line 2—2 of Fig. 1;

Fig. 3 is a view of a portion of Fig. 1, showing the method of removing or inserting the valve member; and Fig. 4 is a partial section on the line 4—4 of Fig. 1.

The embodiment illustrated comprises a hollow casing 10 provided with an inlet opening 11 and an outlet opening 12. These openings 11 and 12 are preferably screw-threaded so that pipes may be conveniently connected thereto. A partition 14 divides the interior of the casing into an inlet chamber 15 and an outlet chamber 16, and this partition is provided with an opening 18 which is controlled by a valve member 19. The opening 18 is preferably formed in a member 20 which is screw-threaded into the partition 14 and provides an annular valve seat for contact with the valve member 19.

In order to actuate the valve member automatically, I provide a pressure responsive device, shown as a flexible diaphragm 22, which is connected to the valve member by means of a lever 23. In the embodiment illustrated, the diaphragm 22 forms one wall of the outlet chamber 16 and hence is subjected on one side to the fluid pressure within this chamber. A flanged cover plate 24 serves to clamp the peripheral portion of the diaphragm against the casing 10. The diaphragm is supported against the fluid pressure by means of a pressure plate 26 and a coiled compression spring 27. The end of the spring remote from the diaphragm rests in a hollow plug 29 which is adjustable in a screw-threaded opening 30 in the cover plate 24. With this construction the force of the spring can be varied as desired. A plug 31 closes the opening 30. The cover plate is shown provided with a vent opening 32 which is preferably screw-threaded so that a pipe may be connected to carry away safely any fluid which may escape in the event of diaphragm rupture.

The lever 23 is preferably of the first class, and is shown fulcrumed on a pin 34. This pin may be formed integral with a screw 35 which is threaded into the side of the casing 10, as illustrated in Fig. 2. The long arm of the lever is connected to the diaphragm 22, and for this purpose I preferably utilize a member 37 mounted on the diaphragm and shaped to provide two spaced opposed parallel plane surfaces 38 and 39. A sphere 41 is formed on the end of the lever and located between these surfaces 38 and 39, the diameter of the sphere being substantially equal to the distance between the surfaces. By thus providing spherical surfaces in combination with plane surfaces, I prevent any possibility of the diaphragm imparting lateral forces to the lever and thereby causing the lever to bind. It will be clear from Fig. 4 that the movements of the member 37 relative to the lever are unobstructed in a direction perpendicular to the plane of movement of the lever. The member 37 is firmly fastened to the diaphragm and pressure plate by means of a stud 42 and a nut 43. With this construction the diaphragm will respond to slight changes in the fluid pressure and impart a reciprocating movement to the member 37 in a line perpendicular to the surfaces 38 and 39. The lever makes point contact with each of these surfaces without lost motion in the line of this reciprocating movement, and the plane surfaces are sufficiently extensive to allow appreciable movement of the member 37 relative to the lever in all directions perpendicular to this line.

The valve member 19 is shown hexagonal in cross-section, and is preferably provided with a disk 45 at its lower end for contact with the valve seat 20. The upper portion of the valve member is slidably supported in a cylindrical opening or guideway 46 formed in a closure 47. This closure 47 is shown in the form of a plug screw-threaded in an opening 48 in the casing 10. Because of the hexagonal form of the valve member, it will slide freely, and no fluid can be trapped in the upper end of the guideway.

The short arm of the lever 23 is connected to the valve member 19. For this purpose the valve member is provided with a lateral recess or opening 50 shaped to receive the end of the lever. In the preferred construction illustrated the opening 50 is cylindrical and extends all the way through the valve member, and the end portion of the lever is made in the form of a sphere 51 substantially equal to the opening 50 in diameter. The opening 48 in the casing is made considerably larger than the valve member, so that after the plug 47 is removed the valve member may be moved laterally and then withdrawn without disturbing the lever, as indicated in Fig. 3.

The operation of the invention will now be apparent from the above disclosure. The fluid to be controlled, such as gas, is supplied under pressure to the inlet 11, and is discharged through the outlet 12. Whenever the pressure in the discharge chamber 16 decreases slightly, the diaphragm 22 will be moved downwardly by the spring 27, thus rocking the lever 23 and raising the valve member 19. This will allow more gas to flow through the opening 18 and restore the desired pressure in the chamber 16. Similarly, an increased pressure on the diaphragm will result in moving the valve toward its closed position. In normal operation, the diaphragm will float with the valve open just enough to maintain the desired discharge pressure. If the diaphragm should swing or tip laterally the mechanism will still operate smoothly, since no lateral force can be imparted to the lever by the diaphragm. The member 37 can always move freely relative to the sphere 41 in lateral directions, and yet there is no lost motion vertically. The slidable valve member 19 is actuated positively in both directions, and can be easily replaced when necessary by an unskilled laborer without disturbing the lever 23 or any of the connecting pipes. It is merely necessary to unscrew the plug 47, whereupon the valve member may be moved laterally and upwardly through the opening 48. A new valve member may be inserted by reversing this procedure.

Having thus described my invention, what I claim as new and desire to secure by Letters Patent is:

1. A regulating valve comprising a casing having an inlet, an outlet and an opening, a closure fastened to the casing and closing the opening, said closure being shaped to provide a guideway, a valve member slidably supported by said guideway and arranged to control the flow between the inlet and the outlet, a fluid pressure responsive device, and a pivotally mounted lever actuated by said device and directly connected to the valve member to move the valve member positively in both directions along the guideway without preventing lateral movement of the valve member, the opening being of sufficient size to permit the valve member to be moved first laterally and then outwardly therethrough after the closure is removed, without disturbing the lever.

2. A regulating valve comprising a casing having an inlet, an outlet and an opening, a closure fastened to the casing and closing the opening, said closure being shaped to provide a guideway, a valve member slidably supported by said guideway and arranged to control the flow between the inlet and the outlet, a fluid pressure responsive device, and a pivotally mounted lever actuated by said device and directly connected to the valve member to move the valve member positively in both directions along the guideway, the guideway being the sole support for the valve member in one lateral direction, and the opening being sufficiently extensive in said lateral direction to permit the valve member to be moved first in said lateral direction and then outwardly through the opening after the closure is removed, without disturbing the lever.

3. A regulating valve comprising a casing having an inlet, an outlet and an opening, a closure fastened to the casing and closing the opening, said closure being shaped to provide a guideway, a valve seat in line with the guideway, a valve member slidably supported by said guideway and having a substantially flat end portion which cooperates with the valve seat in controlling the flow between the inlet and the outlet, a fluid pressure responsive device, and a pivotally mounted lever actuated by said device and directly connected to the valve member to move the valve member positively in both directions along the guideway without preventing movement of the valve member in one lateral direction, the opening being sufficiently extensive in said lateral direction to permit the valve member to be moved first in said lateral direction and then outwardly through the opening after the closure is removed, without disturbing the lever.

4. A regulating valve comprising a casing having an inlet, an outlet and an opening, a closure fastened to the casing and closing the opening, said closure being shaped to provide a guideway, a valve seat in line with the guideway, a valve member slidably supported by said guideway and having a substantially flat disk on one end which cooperates with the valve seat in controlling the flow between the inlet and the outlet, a fluid pressure responsive device, and a pivotally mounted lever actuated by said device, the valve member having a lateral recess into which one end of the lever projects to move the valve member positively in both directions along the guideway, the opening being sufficiently extensive to permit the valve member to be moved first in a lateral direction away from the lever and then outwardly through the opening after the closure is removed, without disturbing the lever.

5. A regulating valve comprising a casing, a flow controlling valve member therein, a lever arranged to actuate the valve member, an actuating member for the lever shaped to provide two spaced opposed parallel plane surfaces, and a flexible fluid pressure responsive diaphragm arranged to impart a reciprocating movement to the actuating member in a line perpendicular to the plane surfaces, the lever being shaped to make point contact with each of the plane surfaces without lost motion in the line of said reciprocating movement, and the plane surfaces being sufficiently extensive to allow appreciable movement of the actuating member relative to the lever in all directions perpendicular to the line of said reciprocating movement.

6. A regulating valve comprising a pivotally mounted lever, an actuating member for the lever, one of said parts being shaped to provide two spaced opposed parallel plane surfaces, and the other of said parts being provided with spherical surfaces which contact with these plane surfaces, a flexible fluid pressure responsive diaphragm connected to said member, and a flow controlling valve member arranged to be actuated by the lever.

7. A regulating valve comprising a casing, a valve member therein which is movable between an open and a closed position, a lever arranged to actuate the valve member, a flexible fluid pressure responsive diaphragm, and a member movable with the diaphragm and arranged to actuate the lever, the member being shaped to provide two spaced opposed parallel plane surfaces, and the lever being provided with spherical surfaces which contact with these plane surfaces.

PAUL C. TEMPLE.